United States Patent
Huang (10) Patent No.: US 10,520,956 B2
(45) Date of Patent: Dec. 31, 2019

(54) ONE-GAUGE ONE-TURN REGULATOR MANIFOLD

(71) Applicant: CSD Technology Co., Taichung (TW)

(72) Inventor: Chun-Yi Huang, Taichung (TW)

(73) Assignee: CSD Technology Co., Taichung (TW)

( * ) Notice: Subject to any disclaimer, the term of this patent is extended or adjusted under 35 U.S.C. 154(b) by 11 days.

(21) Appl. No.: 15/890,403

(22) Filed: Feb. 7, 2018

(65) Prior Publication Data

US 2018/0259980 A1 Sep. 13, 2018

(30) Foreign Application Priority Data

Mar. 7, 2017 (TW) .............................. 106107325 A (51) Int. Cl.
*F16K 31/12* (2006.01)
*G05D 16/06* (2006.01)

(52) U.S. Cl.
CPC .... *G05D 16/0636* (2013.01); *Y10T 137/7826* (2015.04)

(58) Field of Classification Search
CPC ......... Y10T 137/7826; Y10T 137/7823; Y10T 137/7793
See application file for complete search history.

(56) References Cited

U.S. PATENT DOCUMENTS

| | | | | |
|---|---|---|---|---|
| 2,660,834 A * | 12/1953 | MacGlashan, Jr. | .... | G05D 16/10 137/505.39 |
| 3,699,998 A * | 10/1972 | Baranowski, Jr. | ..... | G05D 16/0663 137/315.04 |
| 4,719,940 A * | 1/1988 | Beavers | ............ | G05D 16/0663 137/505.39 |
| 4,760,862 A * | 8/1988 | Mutou | ............... | G05D 16/0661 137/315.05 |
| 5,086,807 A * | 2/1992 | Lasnier | ................. | G05D 16/10 137/505.11 |
| 5,452,741 A * | 9/1995 | Tomita | ................... | G05D 16/10 137/116.5 |
| 5,711,340 A * | 1/1998 | Gusky | ................ | G05D 16/0663 137/116.5 |
| 5,727,588 A * | 3/1998 | Lin | ..................... | F16K 37/0066 137/116.5 |
| 5,904,178 A * | 5/1999 | Bracey | ............... | G05D 16/0663 137/505.42 |
| 2003/0066562 A1* | 4/2003 | Wakeman | .............. | G05D 16/10 137/505 |

(Continued)

*Primary Examiner* — Robert K Arundale (74) *Attorney, Agent, or Firm* — Alan D. Kamrath; Karin L. Williams; Mayer & Williams PC (57) ABSTRACT

A one-gauge one-turn regulator manifold includes a manifold body, a spring set, a knob set, an annular dial and one inlet pressure gauge. The outlet pressure is selected and adjusted by turning a control knob without a pressure gauge. The control knob with a marker indicating the outlet pressure from zero to maximum is rotatable within one turn. The knob set contains one adjusting screw which is used to fine-tune the pressure, and thus the outlet air pressure is calibrated as expected. The annular dial with pressure tick marks is located between the control knob and the manifold body. The outlet pressure is easy to selected and controlled by turning the knob to the desired pressure makers on the dial without the pressure gauge.

9 Claims, 8 Drawing Sheets

(56) References Cited

U.S. PATENT DOCUMENTS

| | | | |
|---|---|---|---|
| 2010/0212757 A1* | 8/2010 | Patterson | G05D 16/103 137/505 |
| 2012/0325338 A1* | 12/2012 | Pettinaroli | F24D 19/1015 137/505 |
| 2015/0059879 A1* | 3/2015 | Nakamura | G05D 16/10 137/505.21 |
| 2016/0138578 A1 | 5/2016 | White et al. | |

* cited by examiner

ONE-GAUGE ONE-TURN REGULATOR MANIFOLD

BACKGROUND OF THE INVENTION

1. Field of the Invention

The invention relates to a pressure regulator manifold, and particularly to a single-gauge knob-type pressure regulator which has a pressure gauge connected to an inlet side of the manifold to display an input pressure value, but has no pressure gauge connected to an outlet side of the manifold. The outlet pressure is easily adjusted by rotating the knob to the desired pressure value on the dial without using the outlet pressure gauge.

2. Description of Related Art

A conventional pressure regulator manifold of an air compressor has an outlet pressure gauge to indicate the pressure value while rotating the knob on the regulator. A conventional pressure regulator manifold of an air compressor has two pressure gauges, wherein one of the gauges connected to the inlet end shows the input pressure value and the other gauge connected to the regulator on the outlet end shows the output pressure value. U.S. Patent Publication No. 2016/0138578 entitled "Air compressor assembly having a condensate management system" provides an air compressor assembly structure in which a motor pumps the air from an intake port through a non-return splitter valve into the air reservoir, and an output air pressure regulator is connected to the outlet end of the manifold. The main technical feature is that the condensate in the air reservoir is easily discharged in this spatial arrangement of the compressor assembly. The pressure regulator disclosed is a single-gauge knob-type pressure regulator. However, the conventional pressure regulator manifold of an air compressor did not mention the structure of the pressure regulator in the technical contents.

To overcome the shortcomings of the conventional pressure regulator manifold, the present invention provides a one-gauge one-turn regulator manifold to mitigate or obviate the aforementioned problems.

SUMMARY OF THE INVENTION

The main objective of the present invention is to provide a one-gauge one-turn regulator manifold which has a pressure gauge connected to an inlet side of the manifold to display an input pressure value, but has no pressure gauge connected to an outlet side of the manifold. The outlet pressure is easily adjusted by rotating a knob to the desired pressure value on a dial without using the outlet pressure gauge.

The one-gauge one-turn regulator manifold includes a manifold body, a spring set, a knob set, an annular dial and one inlet pressure gauge. The outlet pressure is selected and adjusted by turning a control knob on the regulator manifold without a pressure gauge. The control knob with a marker indicating the outlet pressure from zero to maximum is rotatable within one turn. The knob set contains one adjusting screw which is used to fine-tune the pressure, and thus the outlet air pressure is calibrated as needed. The annular dial with pressure tick marks is located between the control knob and the manifold body. The outlet pressure is easy to selected and controlled by turning the knob to the desired pressure markers on the dial without the pressure gauge.

Other objects, advantages, and novel features of the invention will become more apparent from the following detailed description when taken in conjunction with the accompanying drawings.

DETAILED DESCRIPTION OF PREFERRED EMBODIMENT

With reference to FIGS. 1 to 5, a one-gauge one-turn regulator manifold in accordance with the present invention includes a manifold body 10, a spring set 20, a knob set 30, an annular dial 40, and an inlet pressure gauge 50. The one-gauge one-turn regulator manifold provides a quick selection and a stable output of outlet pressure by directly turning a knob shell 33 without using any outlet pressure gauge. All components are also illustrated with reference to FIG. 3.

Figure 1:
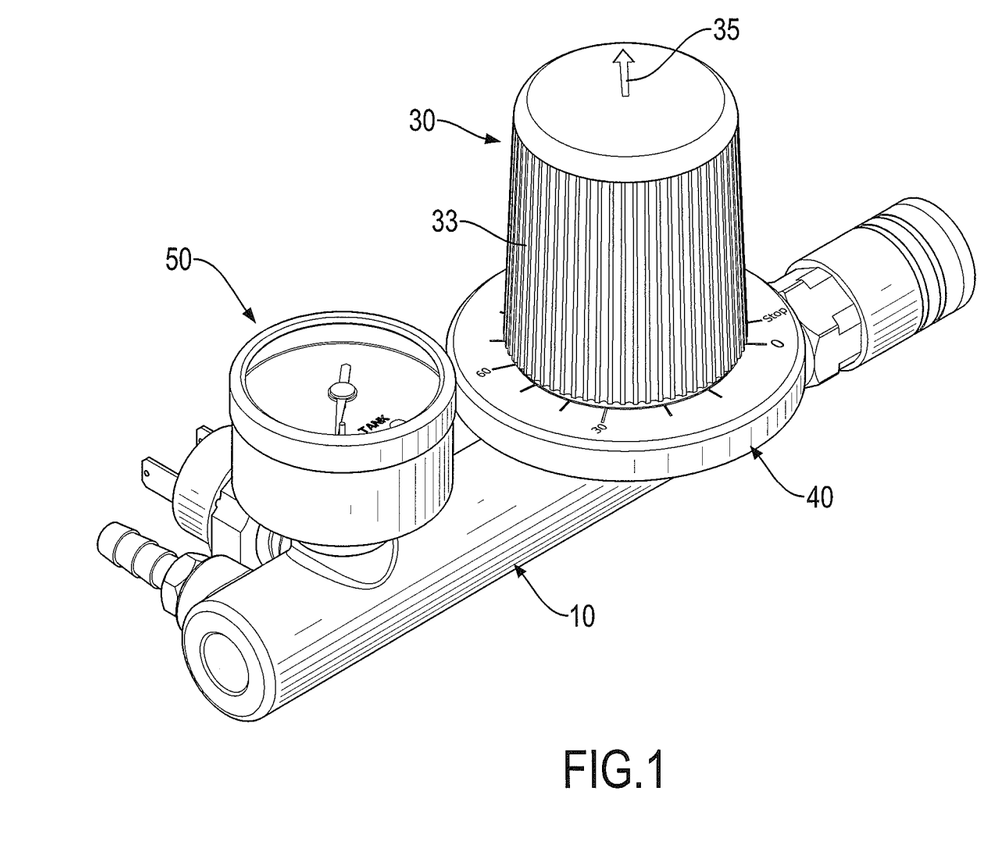
FIG. 1 is a perspective view of a one-gauge one-turn regulator manifold in accordance with the present invention.
Figure 2A:
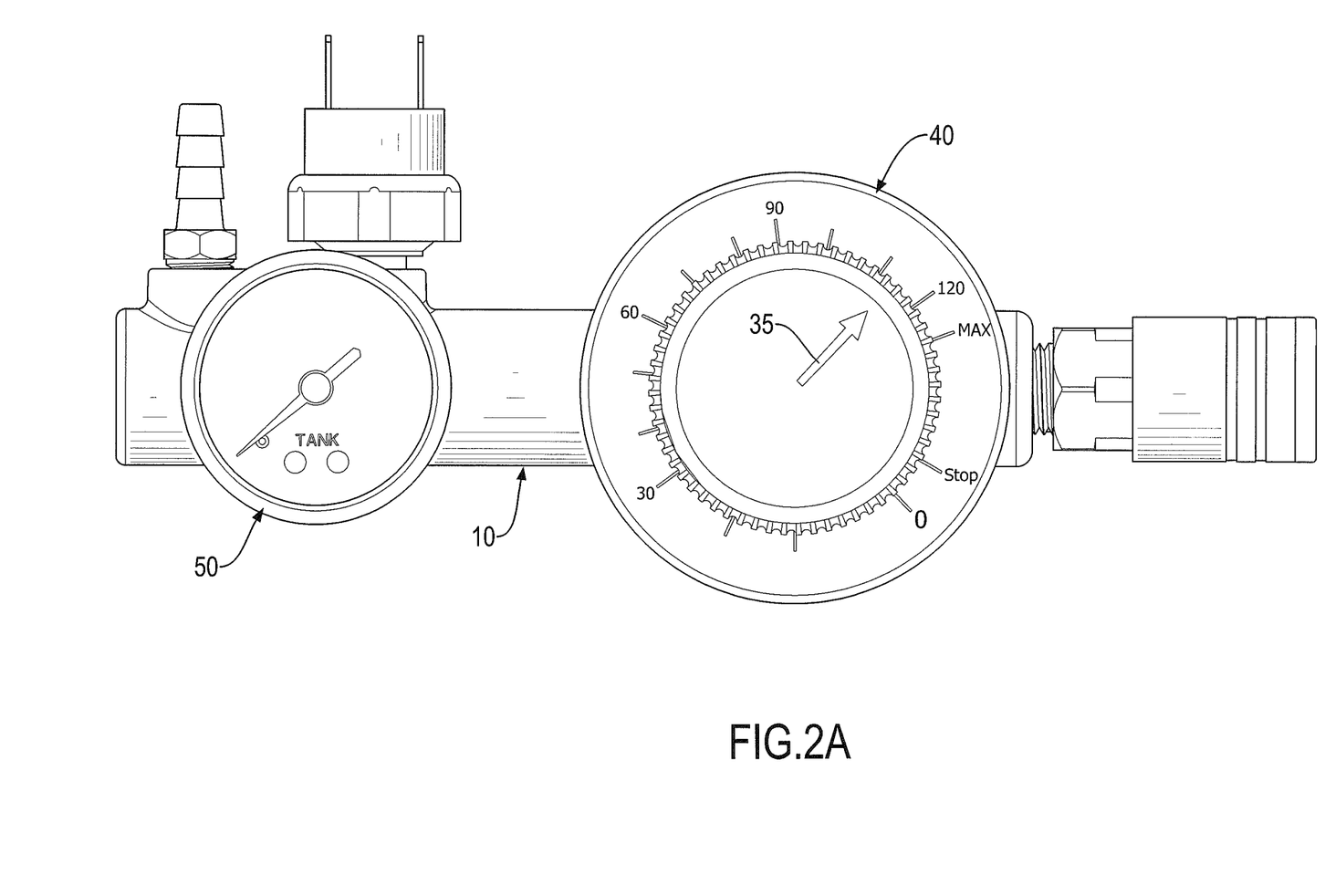
FIG. 2A is a top view of the one-gauge one-turn regulator manifold in FIG. 1.
Figure 2B:
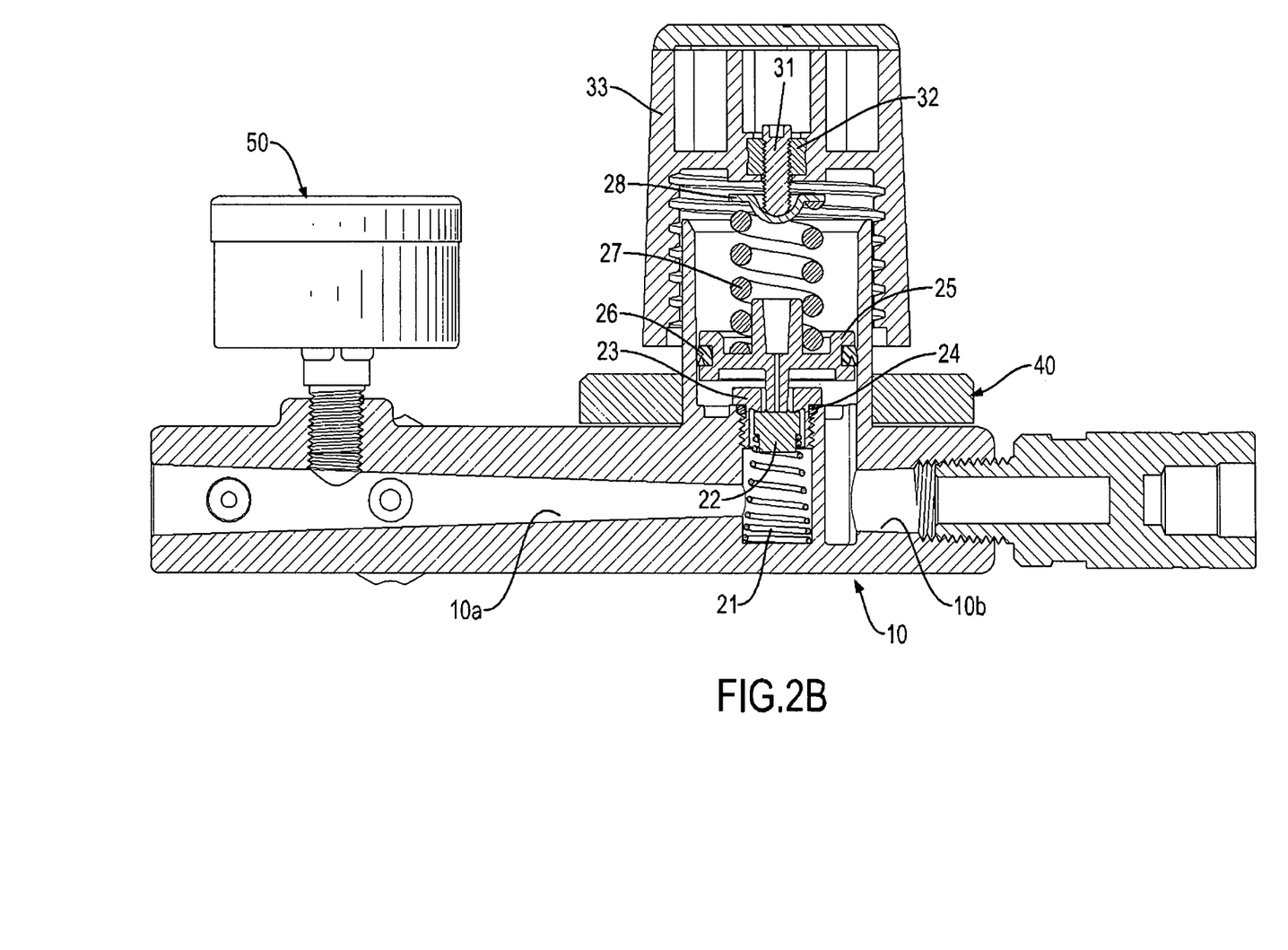
FIG. 2B is a cross sectional side view of the one-gauge one-turn regulator manifold in FIG. 1.
Figure 3:
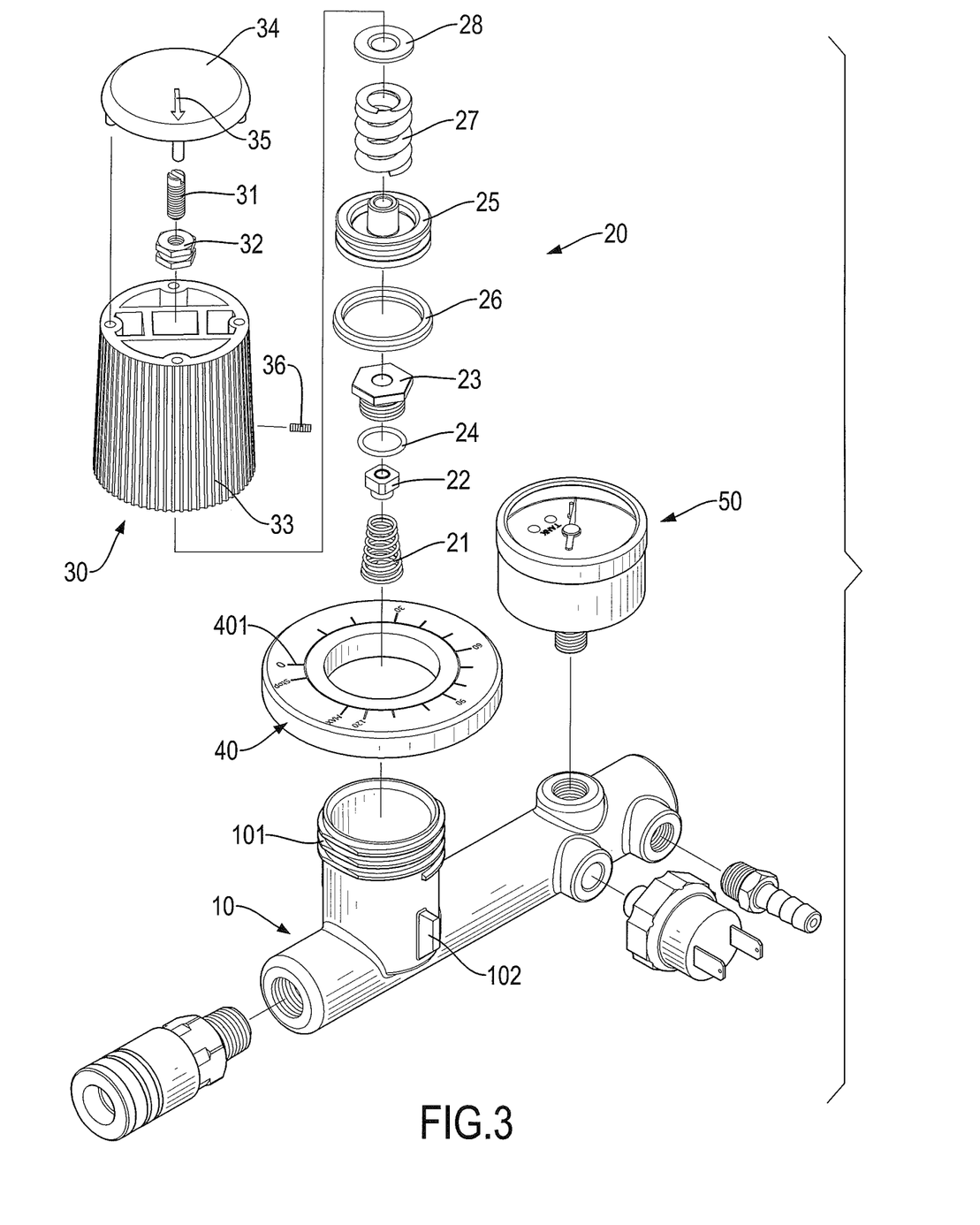
FIG. 3 is an exploded perspective view of the one-gauge one-turn regulator manifold in FIG. 1A.

The manifold body 10 is a key part for the combination of the regulator manifold in accordance with the present invention, and the manifold body 10 may be made of an aluminum alloy or a zinc alloy. With reference to FIGS. 2 and 3, the manifold body 10 includes an inlet side 10a and an outlet side 10b for compressed air, the inlet pressure gauge 50 is mounted on the inlet side 10a for showing the pressure value of the compressed air, and the air flows from the inlet side 10a and passes through a middle portion of the manifold body 10, wherein the spring set 20 is used to adjust air pressure, and then the air passes through the outlet side 10b of the manifold body 10. The output air pressure is adjusted by changing the compression and extension of the spring set 20. To compress the spring set 20 may enlarge a valve opening for a higher output pressure. Alternatively, to loosen the spring may lessen a valve opening for a lower output pressure.

Figure 4A:
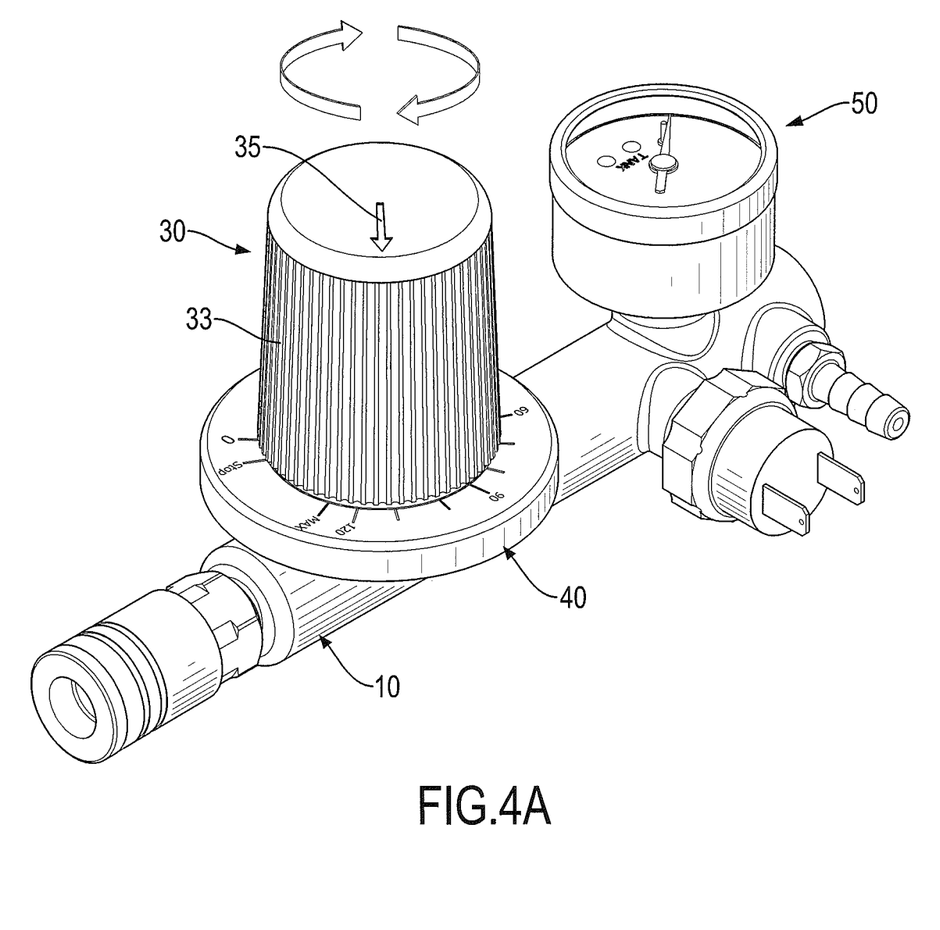
FIG. 4A is an operational perspective view of the one-gauge one-turn regulator manifold in FIG. 1.
Figure 4B:
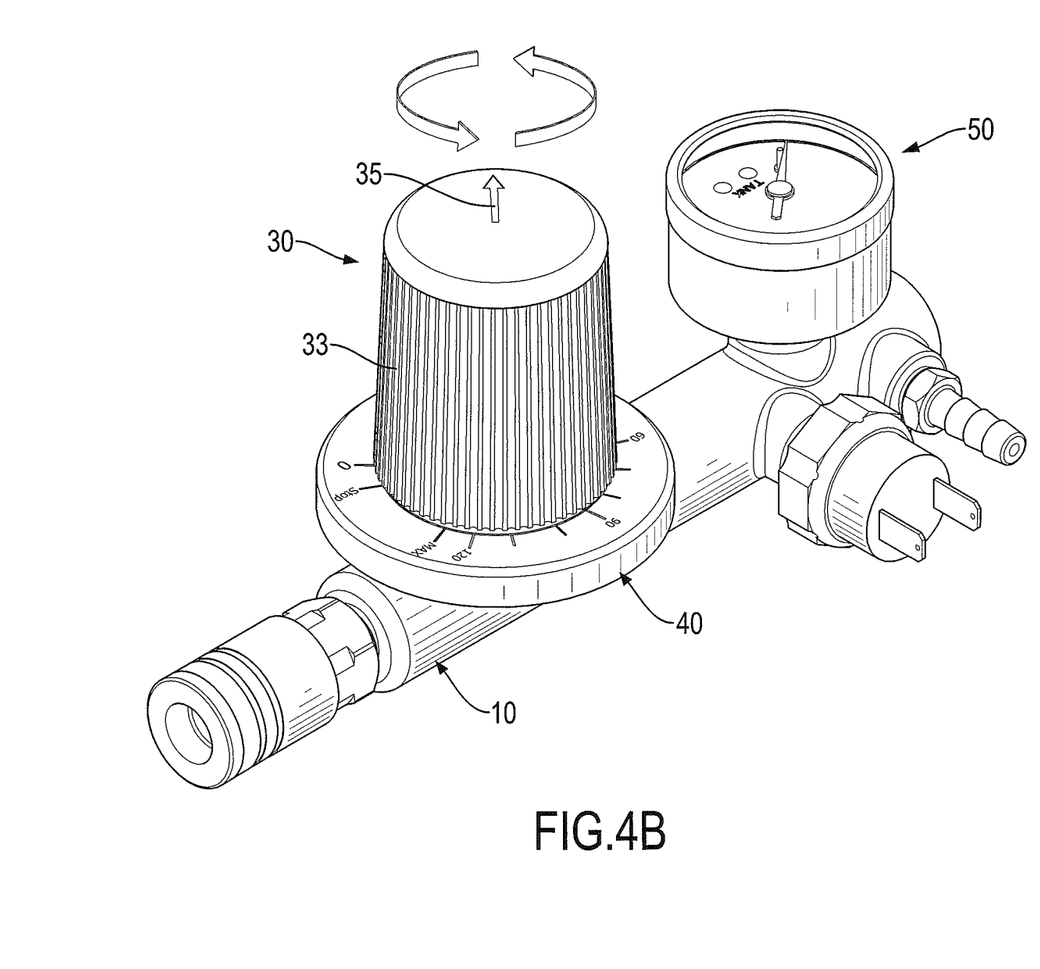
FIG. 4B is another operational perspective view of the one-gauge one-turn regulator manifold in FIG. 1.

With reference to FIG. 43 the manifold body 10 is integrally formed with an external thread 101 having a pitch and a knob stop 102. The external thread 101 is fitted with the knob shell 33 having an internal thread to form a rotary mechanism of the regulator manifold. The knob stop 102 prevents the knob shell 33 from over-rotating and keeps the operating pressure under a limit.

The spring set 20 is the key mechanism for the pressure stability of the regulator manifold in accordance with the present invention. As shown in FIGS. 2 and 3, the spring set 20 has a poppet spring 21, a poppet 22, a poppet seat 23, an O-ring 24, a piston 25, a sealing ring 26, a range spring 27, and a spring cap 28. The spring set 20 is installed inside the middle portion of the manifold body 10. Preferably, by using the materials which are resistant to both corrosion and weariness for these components, the accuracy of output pressure is well controlled. For example, the material of the poppet spring 21 is preferably stainless steel SUS301, and the spring constant of the poppet spring 21 is within the range of 1.0 N/mm to 1.5 N/mm, preferably 1.2 N/mm. The material of the range spring 27 is preferably 65Mn spring steel, and the spring constant of the range spring 27 is within the range of 150 N/mm to 160 N/mm, preferably 154 N/mm.

The knob set 30 is a key design for ease in use of the regulator manifold. With reference to FIGS. 2 to 5, a preferred embodiment of the knob set 30 includes an adjusting screw 31, a nut 32, the knob shell 33, a knob cap 34, an indicator 35, and a pin 36. The knob shell 33 has an internal thread 301 engaged with an external thread 101 of the manifold body 10, and the pin 36 is inserted into the knob shell 33.

Please refer to FIG. 2 and FIG. 4. The adjusting screw 31 in the knob set 30 directly abuts against the spring cap 28 of the spring set 20, thereby transferring the force from the knob set 30 to the entire spring set 20. The output pressure can be easily adjusted by rotating the knob set 30 manually, the output pressure will be zero when the knob set 30 is rotated counterclockwise until the pin 36 is stopped by the end of the internal thread 101, and the output pressure will be the maximum when the knob set 30 is rotated clockwise until the knob shell 33 is stopped by the knob stop 102, so that user can adjust the air pressure in full range (zero to maximum).

Figure 5A:
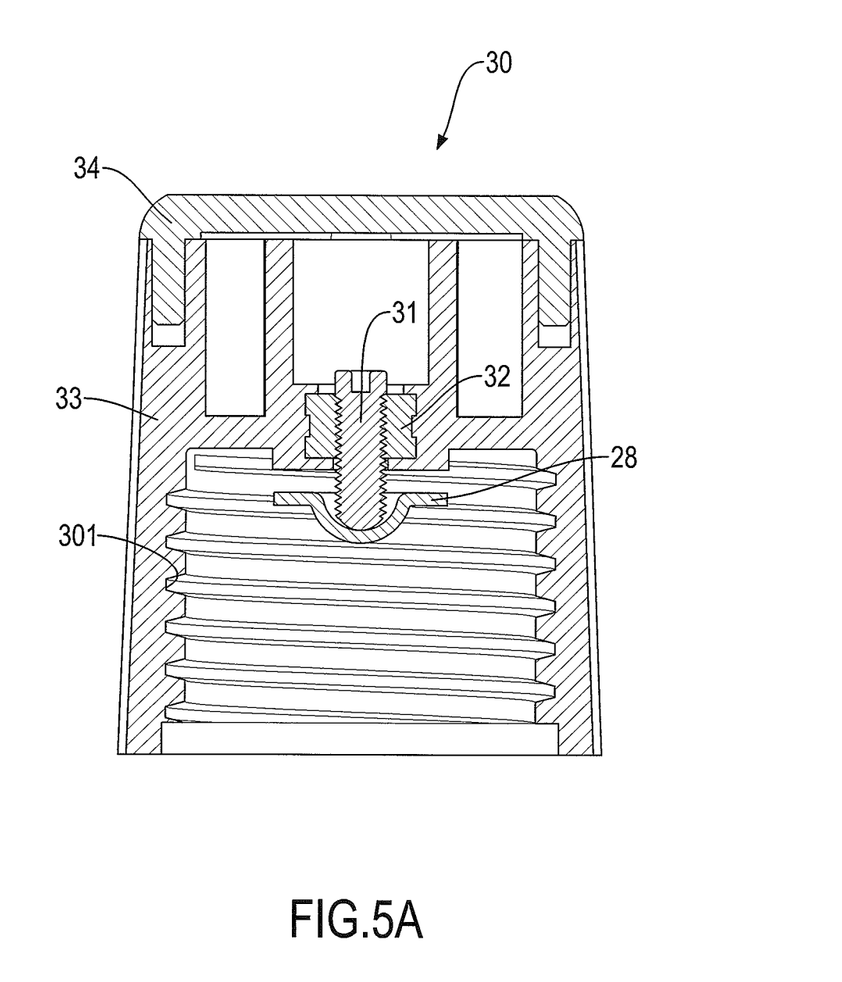
FIG. 5A is a cross sectional side view of a knob set of the one-gauge one-turn regulator manifold in FIG. 1.
Figure 5B:
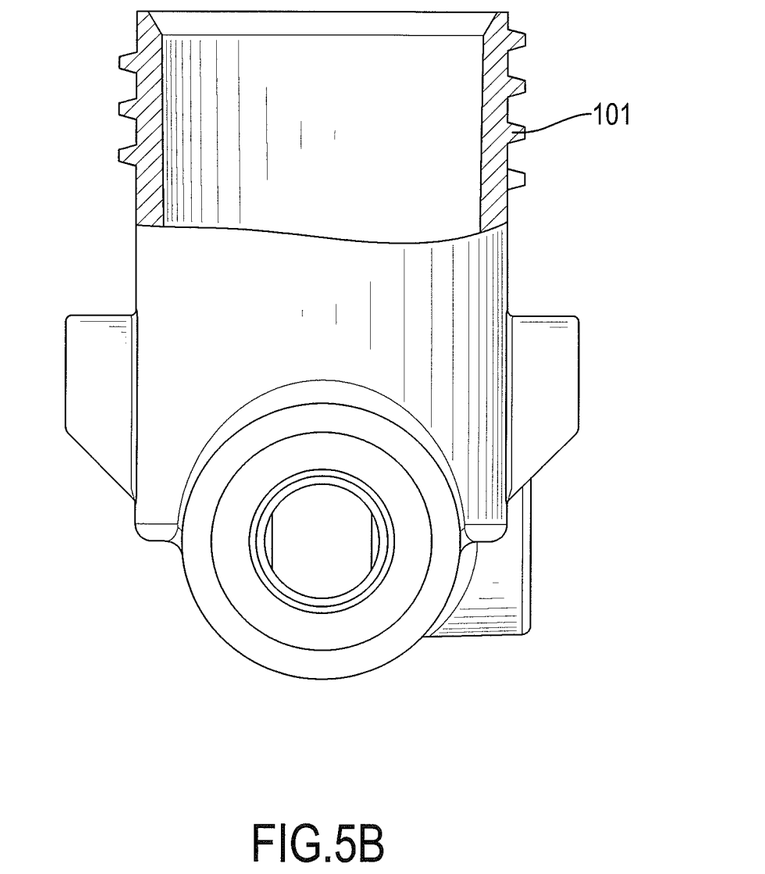
FIG. 5B is a top view in partial section of a knob set of the one-gauge one-turn regulator manifold in FIG. 1.

Please refer to FIG. 5. An object of the present invention is to provide a full-range adjustment of output air pressure within one revolution. Preferably, the internal thread 301 of the knob shell 33 and the external thread 101 of the manifold body 10 are adapted by coarse-grade threads, and the thread pitch would be large enough to cover a full-range adjustment of the output pressure. The pin 36 and the knob stop 102 are properly located to limit a range of pressure adjustment. The external thread 101 of the manifold body 10 should have a sufficient number of turns and the pitch should not be too wide to prevent the knob shell from rotating by mechanical vibrations. It has been recommended by the inventors of the present invention that the number of turns for the external thread 101 of the manifold body 10 should fall within the range of 3 to 6 turns, and the thread pitch should fall within the range of 2 to 6 mm, preferably 3 to 5 mm. The pitch of the internal and external threads should be correlated to the spring constant (force constant) of the range spring 27 and the poppet spring 21.

With reference to FIG. 5, the adjusting screw 31 has a round tip to prevent the spring set 20 from being misaligned while rotating the knob shell. The spring cap 28 also has a circular recess, so that the torsional friction between the adjusting screw 31 and the spring cap 28 is reduced for continuous and smooth adjustment. The calibration of output pressure is operated by rotating the adjusting screw 31 through the nut 32, and the adjusting screw 31 and the nut 32 are engaged with fine-grade threads. Besides, an anaerobic adhesive is applied between the adjusting screw 31 and the nut 32 to ensure that the calibration is reliable and the output pressure is stable under the vibration of the air compressor.

The annular dial 40 is a key design for the selection of output pressure in the regulator manifold. Please refer to FIG. 2, which shows a preferred embodiment of an annular dial 40 of the present invention. The annular dial 40 is located around the knob set 30 on the manifold body 10, and has tick marks 401 to indicate the outlet pressure. The indicator 35 can be aligned with a specific tick mark 401 by turning the knob shell 33. The output pressure can be adjusted in a full range (zero to maximum) by turning the knob shell within one revolution (less than 360°), preferably less than 350°. The operation range of the knob shell is more than 180° to provide a minimum resolution (psi/degree) for the pressure adjustment. The tick marks 401 can also be complemented by use of texts or icons, for example, "30 psi for air guns", "90 psi for pneumatic tools" which is easy to select by switching the indicator 35 to the icon or text displayed on the annular dial 40.

The outlet pressure gauge 50 is the only pressure gauge in the regulator manifold of the present invention. Referring to FIG. 2, the pressure gauge 50 which is connected to the inlet side 10a of the manifold body 10 shows the pressure value of the input compressed gas, and is applicable with a pressure range of 30 to 180 psi.

This newly invented one-gauge one-turn regulator manifold can be connected with an air compressor, a hydraulic pipe, and the like to adjust the output of the gas pressure, and is suitable for all kinds of pneumatic tools and pneumatic fittings. The invention can be employed to the input gas pressure as high as 145 psi, or 10 kg/cm$^2$, or 10 bar. The output gas pressure may be zero at the time of valve clearance, up to 145 psi at maximum valve opening, or 10 kg/cm$^2$, or 10 bar. The following three embodiments illustrate the efficacy of the present invention in terms of "assembly consistency", "operational convenience" and "pressure stability".

Example 1: "Assembly Consistency" Quality Test

As shown in FIG. 1 to FIG. 5, all components of the one-gauge one-turn regulator manifold are made of the same material: the internal thread of the manifold body pitch is 4 mm, the K value of the range spring is 154 N/mm, and the K value of the poppet spring is 1.2 N/mm.

Preferably, 111 pieces of calibrated assemblies were tested for the rotation angle of the corresponding knob with different output pressures (30, 60, 90, 120, 135 psi) and the measured statistical analysis was recorded in Table 1.

The results show that the quality of assemblies is the same, and the relative standard deviation (RSD) of the experimental data is within 5%.

TABLE 1

Statistical analysis of the rotation angle of the corresponding knob with different output pressures

| Sample | Output Pressure(psi) | | | | |
|---|---|---|---|---|---|
| No. | 30 | 60 | 90 | 120 | 135 |
| NO. 01 | 134 | 204 | 268 | 321 | 341 |
| NO. 02 | 130 | 197 | 260 | 321 | 341 |
| NO. 03 | 132 | 203 | 265 | 325 | 345 |
| NO. 04 | 130 | 195 | 264 | 324 | 347 |
| NO. 05 | 130 | 195 | 260 | 315 | 338 |
| NO. 06 | 131 | 194 | 265 | 317 | 339 |
| NO. 07 | 128 | 194 | 260 | 320 | 341 |
| NO. 08 | 133 | 193 | 260 | 321 | 338 |
| NO. 09 | 132 | 197 | 264 | 324 | 338 |
| NO. 10 | 134 | 203 | 267 | 328 | 343 |
| NO. 11 | 137 | 198 | 266 | 314 | 345 |
| NO. 12 | 137 | 202 | 269 | 319 | 338 |
| NO. 13 | 138 | 198 | 260 | 320 | 341 |
| NO. 14 | 131 | 197 | 266 | 323 | 338 |
| NO. 15 | 130 | 196 | 266 | 323 | 341 |
| NO. 16 | 131 | 197 | 264 | 324 | 341 |
| NO. 17 | 135 | 204 | 267 | 326 | 338 |

TABLE 1-continued

Statistical analysis of the rotation angle of the corresponding knob with different output pressures

| Sample No. | Output Pressure(psi) | | | | |
|---|---|---|---|---|---|
| | 30 | 60 | 90 | 120 | 135 |
| NO. 18 | 136 | 205 | 270 | 325 | 341 |
| NO. 19 | 133 | 198 | 263 | 321 | 341 |
| NO. 20 | 131 | 197 | 260 | 320 | 341 |
| NO. 21 | 130 | 193 | 260 | 320 | 341 |
| NO. 22 | 135 | 203 | 268 | 327 | 338 |
| NO. 23 | 135 | 200 | 267 | 322 | 341 |
| NO. 24 | 134 | 198 | 265 | 325 | 341 |
| NO. 25 | 133 | 199 | 270 | 327 | 338 |
| NO. 26 | 135 | 200 | 262 | 315 | 338 |
| NO. 27 | 132 | 199 | 266 | 324 | 341 |
| NO. 28 | 135 | 200 | 265 | 322 | 338 |
| NO. 29 | 130 | 196 | 259 | 317 | 338 |
| NO. 30 | 135 | 198 | 261 | 323 | 341 |
| NO. 31 | 136 | 202 | 264 | 317 | 341 |
| NO. 32 | 135 | 201 | 265 | 320 | 338 |
| NO. 33 | 130 | 197 | 264 | 326 | 341 |
| NO. 34 | 130 | 192 | 258 | 320 | 338 |
| NO. 35 | 130 | 200 | 270 | 321 | 341 |
| NO. 36 | 133 | 199 | 268 | 315 | 338 |
| NO. 37 | 135 | 200 | 263 | 312 | 338 |
| NO. 38 | 130 | 202 | 264 | 318 | 338 |
| NO. 39 | 130 | 193 | 258 | 324 | 341 |
| NO. 40 | 137 | 199 | 263 | 315 | 338 |
| NO. 41 | 130 | 198 | 261 | 317 | 343 |
| NO. 42 | 130 | 192 | 260 | 317 | 338 |
| NO. 43 | 130 | 193 | 260 | 322 | 338 |
| NO. 44 | 130 | 195 | 262 | 320 | 338 |
| NO. 45 | 130 | 194 | 258 | 320 | 338 |
| NO. 46 | 131 | 195 | 258 | 319 | 341 |
| NO. 47 | 130 | 195 | 258 | 320 | 341 |
| NO. 48 | 129 | 194 | 257 | 317 | 338 |
| NO. 49 | 132 | 196 | 258 | 315 | 341 |
| NO. 50 | 135 | 200 | 262 | 319 | 338 |
| NO. 51 | 130 | 195 | 260 | 320 | 338 |
| NO. 52 | 137 | 200 | 261 | 318 | 341 |
| NO. 53 | 130 | 195 | 258 | 320 | 341 |
| NO. 54 | 133 | 197 | 261 | 316 | 341 |
| NO. 55 | 132 | 197 | 258 | 317 | 341 |
| NO. 56 | 135 | 203 | 267 | 320 | 338 |
| NO. 57 | 129 | 195 | 263 | 320 | 341 |
| NO. 58 | 132 | 195 | 260 | 319 | 338 |
| NO. 59 | 130 | 197 | 258 | 315 | 335 |
| NO. 60 | 129 | 195 | 260 | 317 | 341 |
| NO. 61 | 130 | 197 | 260 | 322 | 338 |
| NO. 62 | 132 | 197 | 267 | 315 | 338 |
| NO. 63 | 130 | 202 | 262 | 318 | 341 |
| NO. 64 | 132 | 196 | 262 | 322 | 338 |
| NO. 65 | 138 | 203 | 265 | 318 | 338 |
| NO. 66 | 129 | 195 | 262 | 323 | 341 |
| NO. 67 | 131 | 200 | 260 | 317 | 338 |
| NO. 68 | 133 | 197 | 265 | 318 | 341 |
| NO. 69 | 135 | 202 | 268 | 323 | 338 |
| NO. 70 | 135 | 198 | 261 | 315 | 341 |
| NO. 71 | 131 | 195 | 262 | 320 | 341 |
| NO. 72 | 130 | 195 | 260 | 319 | 338 |
| NO. 73 | 135 | 200 | 265 | 317 | 338 |
| NO. 74 | 132 | 200 | 266 | 320 | 341 |
| NO. 75 | 132 | 197 | 258 | 315 | 338 |
| NO. 76 | 130 | 195 | 259 | 317 | 338 |
| NO. 77 | 137 | 202 | 262 | 315 | 338 |
| NO. 78 | 135 | 198 | 260 | 316 | 341 |
| NO. 79 | 135 | 201 | 264 | 326 | 338 |
| NO. 80 | 135 | 200 | 267 | 319 | 338 |
| NO. 81 | 130 | 201 | 270 | 318 | 341 |
| NO. 82 | 130 | 198 | 261 | 321 | 341 |
| NO. 83 | 135 | 198 | 258 | 317 | 343 |
| NO. 84 | 132 | 200 | 266 | 321 | 338 |
| NO. 85 | 130 | 199 | 261 | 317 | 338 |
| NO. 86 | 130 | 203 | 266 | 316 | 338 |
| NO. 87 | 133 | 199 | 260 | 318 | 338 |
| NO. 88 | 132 | 199 | 270 | 325 | 338 |
| NO. 89 | 135 | 198 | 261 | 319 | 338 |
| NO. 90 | 131 | 200 | 267 | 325 | 341 |
| NO. 91 | 133 | 198 | 260 | 319 | 341 |
| NO. 92 | 135 | 203 | 263 | 320 | 341 |
| NO. 93 | 130 | 202 | 267 | 322 | 338 |
| NO. 94 | 132 | 203 | 266 | 322 | 345 |
| NO. 95 | 130 | 198 | 262 | 316 | 341 |
| NO. 96 | 132 | 201 | 265 | 316 | 343 |
| NO. 97 | 130 | 199 | 262 | 318 | 338 |
| NO. 98 | 130 | 197 | 261 | 319 | 338 |
| NO. 99 | 132 | 201 | 263 | 323 | 343 |
| NO. 100 | 135 | 200 | 265 | 319 | 338 |
| NO. 101 | 132 | 203 | 267 | 315 | 341 |
| NO. 102 | 132 | 197 | 259 | 318 | 338 |
| NO. 103 | 133 | 201 | 270 | 321 | 338 |
| NO. 104 | 130 | 195 | 260 | 314 | 338 |
| NO. 105 | 132 | 197 | 263 | 320 | 341 |
| NO. 106 | 134 | 198 | 263 | 324 | 343 |
| NO. 107 | 132 | 198 | 264 | 321 | 338 |
| NO. 108 | 131 | 202 | 264 | 324 | 338 |
| NO. 109 | 132 | 203 | 265 | 322 | 343 |
| NO. 110 | 134 | 202 | 260 | 321 | 345 |
| NO. 111 | 131 | 196 | 265 | 322 | 338 |
| Average | 132.3 | 198.4 | 263.0 | 319.8 | 339.7 |
| Standard Deviation | 2.4 | 3.0 | 3.4 | 3.4 | 2.1 |
| Max. | 138 | 205 | 270 | 328 | 347 |
| Min. | 128 | 192 | 257 | 312 | 335 |
| Difference | 10 | 13 | 13 | 16 | 12 |

Example 2: "Operational Convenience" Comparison Test

Compared with a conventional two-gauge regulator manifold, the one-gauge one-turn regulator manifold of the present invention takes less time in adjusting output pressure from zero to a required pressure (30, 60, 90, 120, 135 psi). The time recorded is shown in Table 2. The result proves that the present invention has the advantages of both convenience and efficiency.

TABLE 2

Comparison of the time required to adjust to different output pressures

| Test Sample | Output Pressure (psi) | | | | |
|---|---|---|---|---|---|
| | 30 | 60 | 90 | 120 | 135 |
| The Invention (One gauge) | 5 | 6 | 8 | 9 | 9 |
| The Conventional (Two gauges) | 6 | 12 | 17 | 22 | 21 |
| Time Saved | 1 | 6 | 9 | 13 | 12 |

Example 3: "Pressure Stability" Comparison Test

At the same input air pressure (135 psi), connect the outlet of the regulator manifolds to the flow meters of the same type, set the flow to the same value, and begin to observe output pressure fluctuations during 120 seconds interval. The results show that the pressure fluctuation of the invention is smaller than that of the conventional two-gauge regulator manifold, as shown in Table 3. It is proved that the pressure output of the invention is stable and is a great improvement over the conventional one.

TABLE 3

Comparison of output pressure (psi) stability at the same input and output conditions

| Test | | 60 seconds interval | | | 120 seconds interval | | |
|---|---|---|---|---|---|---|---|
| Sample | No | Max. | Min. | Difference | Max. | Min. | Difference |
| The Invention (One gauge) | 1 | 51.8 | 51.5 | 0.3 | 51.9 | 51.5 | 0.4 |
|  | 2 | 52.6 | 52.1 | 0.5 | 52.7 | 52.1 | 0.6 |
|  | 3 | 52.2 | 51.6 | 0.6 | 52.3 | 51.6 | 0.7 |
| Compared to the conventional two-gauge regulator: smaller output pressure fluctuation | | | | | | | |
| The Conventional (Two gauges) | 1 | 47.5 | 46.4 | 1.1 | 47.5 | 46.4 | 1.1 |
|  | 2 | 48.5 | 47.4 | 1.1 | 48.5 | 46.8 | 1.7 |
|  | 3 | 48.1 | 46.5 | 1.6 | 48.1 | 45.8 | 2.3 |
| Compared to the invention: bigger output pressure fluctuation | | | | | | | |

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A one-gauge one-turn regulator manifold comprising:
   a manifold body having
      a passage;
      an inlet side communicating with the passage; and
      an outlet side communicating with the passage;
   a spring set located in the manifold body and having
      a poppet spring;
      a poppet;
      a poppet seat;
      an o-ring;
      a piston;
      a sealing ring;
         a range spring; and
         a spring cap;
   a knob set mounted on the outlet side of the manifold body, mounted on the spring set, and having
      an adjusting screw;
      a nut;
      a knob shell having
         an internal thread engaged with an external thread of the manifold body;
         a knob cap;
         an indicator; and
         a pin inserted radially into the knob shell;
   an annular dial combined with an outer side of a circumference of the knob set and having
      multiple tick marks marked on the annular dial; and
   an inlet pressure gage mounted on the inlet side of the manifold body.

2. The one-gauge one-turn regulator manifold as claimed in claim 1, wherein the rotation angle of the knob set is above 180° and less than 350°.

3. The one-gauge one-turn regulator manifold as claimed in claim 1, wherein the pitch of the external thread of the manifold body ranges from 3 to 5 millimeters.

4. The one-gauge one-turn regulator manifold as claimed in claim 1, wherein laps of the external thread of the manifold body are within the range of 3 to 6 turns.

5. The one-gauge one-turn regulator manifold as claimed in claim 1, wherein the poppet spring has a spring constant in the range of 1.0 to 1.5 N/mm, and the range spring has a spring constant within the range of 150 to 160 N/mm.

6. The one-gauge one-turn regulator manifold as claimed in claim 1, wherein said adjusting screw is a circular arc, and a center of the spring cap is a circular cavity.

7. The one-gauge one-turn regulator manifold as claimed in claim 1, wherein an anaerobic adhesive is added between said adjusting screw and said nut to augment the engagement.

8. The one-gauge one-turn regulator manifold as claimed in claim 1, wherein a maximum output pressure value is 135 psi when the knob set is adjusted to the maximum.

9. The one-gauge one-turn regulator manifold as claimed in claim 1, wherein said annular dial is labeled by adding patterns or texts.

* * * * *